US009261614B2

(12) United States Patent
Song et al.

(10) Patent No.: US 9,261,614 B2
(45) Date of Patent: Feb. 16, 2016

(54) STATISTICS-BASED SEISMIC EVENT DETECTION

(75) Inventors: Fuxian Song, Cambridge, MA (US); Norman Warpinski, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 734 days.

(21) Appl. No.: 13/526,027

(22) Filed: Jun. 18, 2012

(65) Prior Publication Data

US 2013/0336091 A1 Dec. 19, 2013

(51) Int. Cl.
*G01V 1/28* (2006.01)

(52) U.S. Cl.
CPC ...................... *G01V 1/288* (2013.01)

(58) Field of Classification Search
CPC ....................................................... G01V 1/288
See application file for complete search history.

(56) References Cited

U.S. PATENT DOCUMENTS

| | | | | | |
|---|---|---|---|---|---|
| 2,521,130 | A | * | 9/1950 | Scherbatskoy | 367/49 |
| 5,661,735 | A | * | 8/1997 | Fischer | G01D 3/08 367/124 |
| 5,707,851 | A | * | 1/1998 | Jones et al. | 435/252.1 |
| 5,774,419 | A | * | 6/1998 | Uhl et al. | 367/38 |
| 8,224,627 | B2 | * | 7/2012 | Mitov | G01S 3/74 702/196 |
| 2006/0184488 | A1 | * | 8/2006 | Wentland | 706/45 |
| 2011/0120702 | A1 | * | 5/2011 | Craig | 166/250.1 |
| 2011/0125471 | A1 | * | 5/2011 | Craig et al. | 703/6 |
| 2012/0243368 | A1 | * | 9/2012 | Geiser et al. | 367/9 |
| 2013/0081805 | A1 | * | 4/2013 | Bradford et al. | 166/250.1 |
| 2013/0144532 | A1 | * | 6/2013 | Williams et al. | 702/11 |
| 2014/0100833 | A1 | * | 4/2014 | Williams et al. | 703/10 |
| 2014/0358503 | A1 | * | 12/2014 | Ciucivara | G01V 3/38 703/2 |
| 2014/0372089 | A1 | * | 12/2014 | Weng et al. | 703/2 |
| 2015/0057933 | A1 | * | 2/2015 | Ma et al. | 702/11 |

OTHER PUBLICATIONS

D. B. Harris. Subspace Detectors: Theory. Lawrence Livermore National Laboratory Report UCRL-TR-222758, (Jul. 1, 2006), 48 pgs. https://e-reports-ext.llnl.gov/pdf/335299.pdf.*

Sinan Saraçli, Nurhan Doğan and İsmet Doğan. Comparison of hierarchical cluster analysis methods by cophenetic correlation.Journal of Inequalities and Applications 2013, 2013:203 doi:10.1186/1029-242X-2013-203 http://www.journalofinequalitiesandapplications.com/content/2013/1/203.*

Bouchon, M., "Discrete Wave Number Representation of Elastic Wave Fields in Three-Space Dimensions", *J. Geophys. Res.*, 84(B7), (1979), 3609-3614.

Earle, P. S., et al., "Characterization of Global Seismograms Using an Automatic-Picking Algorithm", *Bulletin of the Seismological Society of America*, 84(2), (1994), 366-376.

(Continued)

*Primary Examiner* — Ari M Diacou
(74) *Attorney, Agent, or Firm* — Schwegman Lundberg & Woessner, P.A.; John W. Wustenberg

(57) ABSTRACT

Automated detection of microseismic events is performed by a system and method that provides automated calculation of one or more statistical parameters for statistics-based detection of microseismic events of interest. An event detector to perform signal subspace-based detection may automatically, e.g. iteratively, be configured based on the one or more automatically calculated and/or estimated statistical parameters, which may include a signal subspace dimension, an effective embedding dimension, a detection threshold, and/or a false alarm rate. Some of the statistical parameters may be calculated based on custom-generated synthetic seismic data.

19 Claims, 8 Drawing Sheets

(56) References Cited

OTHER PUBLICATIONS

Eckart, C., et al., "The Approximation of One Matrix by Another of Lower Rank", *Psychometrika*, 1(3), (1936), 211-218.

Gibbons, S. J., et al., "The detection of low magnitude seismic events using array-based waveform correlation", *Geophysical Journal International*, 165(1), (2006), 149-166.

Harris, D. B., et al., "A waveform correlation method for identifying quarry explosions", *Bull. Seismol. Soc. Am.*, 81, (1991), 2395-2418.

Harris, D. B., "Subspace Detectors: Theory", Lawrence Livermore National Laboratory Report UCRL-TR-222758, (2006), 48 pgs.

Israelsson, H., "Correlation of Waveforms from Closely Spaced Regional Events", *Bulletin of Seismological Society of America*, 80, (1990), 2177-2183.

Maxwell, S. C., et al., "The role of passive microseismic monitoring in the instrumented oil field", *The Leading Edge*, 20(6), (2001), 636-639.

Scharf, L. L., et al., "Matched subspace detectors", *IEEE Transactions on Signal Processing*, 42(8), (1994), 2146-2157.

Song, F., et al., "An improved method or hydrofracture-induced microseismic event detection and phase picking", *Geophysics*, 75(6), (2010), A47-A52.

Vandecar, J. C., et al., "Determination of teleseismic relative phase arrival times using multi-channel cross correlation and least squares", *Bulletin of the Seismological Society of America*, 80, (1990), 150-169.

Vincent, F., et al., "Matched subspace detection with hypothesis dependent noise power", *IEEE Trans. On Signal Processing*, 56(11), (2008), 5713-5718.

Warpinski, N. R., et al., "Microseismic Monitoring Inside and Out", *Journal of Petroleum Technology, SPE* 61(11), (2009), 80-85.

Wiechecki-Vergara, S., et al., "A New Approach for Statistical Waveform Correlation Detectors", Contract No. DSWA01-98-C-0131, sponsored by The Defense Threat Reduction Agency, (published before Jun. 18, 2012), 10 pgs.

* cited by examiner

STATISTICS-BASED SEISMIC EVENT DETECTION

TECHNICAL FIELD

The present application relates to the detection of microseismic events by processing seismic data. Some example embodiments relate to methods and systems to detect seismic events arising from induced seismic activity in, for example, a hydrocarbon reservoir, an enhanced geothermal system, a nuclear waste repository, or a mine.

BACKGROUND

In passive seismic monitoring, seismic energy is generated by microseismic events resulting typically from shear-stress release on pre-existing geological structures (e.g., faults and fractures), for example due to production/injection induced local earth stress condition perturbations. The seismic energy can be recorded using sensors such as geophones or seismometers placed in a monitoring well and/or on the surface of the earth.

Microseismic events may be seen as small earthquakes. Hydraulic fracturing induced microseismic events typically have a Richter magnitude $M_L < -1$. Production induced events typically have a Richter magnitude $M_L < 3$. Such seismic events are commonly recorded by receivers at distances of over 1 km from the origin of the events. This poses a challenge for event detection due to low signal-to-noise ratios.

Known methods for automated microseismic event detection include short-time-average/long-time-average (STA/LTA) detectors and correlation-type detectors. The STA/LTA detector calculates the energy ratio of short-time window to long-time window and declares the appearance of seismic events when the ratio exceeds a threshold. The correlation detector screens seismic events by calculating a correlation coefficient between the received signal and a template event known as the master event, assuming events that are to be detected have similar waveforms as the master event.

Simple STA/LTA detectors are broadly applicable, but have high false alarm rates when an aggressive threshold is set to detect smaller signals. Correlation detectors are highly sensitive, having high detection probability at low false alarm rates. However, they are applicable only to strictly repetitive sources confined to very compact source regions.

Event detection in a signal subspace has been suggested. (See, for example, D. B. Harris (2006): "Subspace detectors: Theory," Lawrence Livermore Natl. Lab. Rep. UCRL-TR-222758, 46 pp., Lawrence Livermore Natl. Lab., Livermore, Calif.) In these proposed methods, a single matching template in a correlation detection method is replaced with a suite (subspace) of basis vectors that are combined linearly to match occurrences of variable signals from a specific source region.

BRIEF DESCRIPTION OF THE DRAWINGS

Some embodiments are illustrated by way of example and not limitation in the figures of the accompanying drawings in which.

DETAILED DESCRIPTION

Figure 1:
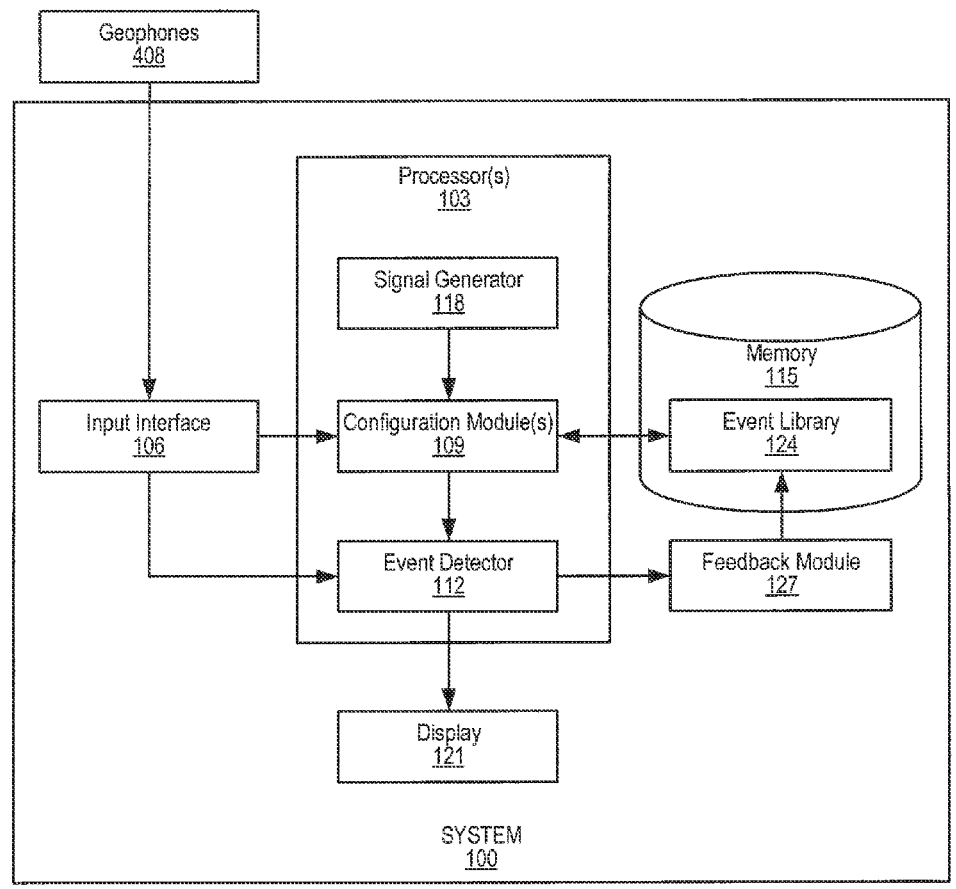
FIG. 1 is a schematic block diagram of an example embodiment of a system to detect microseismic events.

The following detailed description refers to the accompanying drawings that depict various details of examples selected to show how aspects of this disclosure may be practiced. The discussion addresses various examples of the inventive subject matter at least partially in reference to these drawings, and describes the depicted embodiments in sufficient detail to enable those skilled in the art to practice the subject matter disclosed herein. Many other embodiments may be utilized for practicing the inventive subject matter other than the illustrative examples discussed herein, and structural and operational changes in addition to the alternatives specifically discussed herein may be made without departing from the scope of the inventive subject matter.

In this description, references to "one embodiment" or "an embodiment," or to "one example" or "an example," in this description are not intended necessarily to refer to the same embodiment or example; however, neither are such embodiments mutually exclusive, unless so stated or as will be readily apparent to those of ordinary skill in the art having the benefit of this disclosure. Thus, a variety of combinations and/or integrations of the embodiments and examples described herein may be included, as well as further embodiments and examples as defined within the scope of all claims based on this disclosure, and all legal equivalents of such claims.

An example embodiment of this disclosure comprises a system and a method to automatically calculate parameters with respect to which signal subspace detection may be performed and may include automatic construction of signal subspace bases from previously detected events. An event detector may automatically be configured based on the automatically calculated parameters.

First, time series data in the example form of multi-channel seismic waveforms are recorded by a plurality of sensors, for example by a three-component (3C) geophone, or a geophone array.

The multi-channel time series data may be band-pass filtered to remove as much noise as practical. An operator may identify the noise and the signal of interest manually or preliminary noise and signal discrimination may be performed automatically, for example by running a conservative STA/LTA detector on the filtered data. The identified noise may be used to automatically determine an effective embedding space dimension from the statistics of noise sample correlation coefficients. The effective embedding space dimension may be one of a plurality of statistical parameters upon which event detection is based.

An event library may thereafter be built based on potential events identified in the time series data, for example based on the output of a STA/LTA detector with a conservative threshold. The multi-channel time series data may be converted to a single channel multiplexed data vector. Pair-wise correlation coefficients for the events in the event library may then be calculated from the single channel multiplexed data vector. The events may be automatically clustered based on the correlation coefficients.

In this example embodiment, an approach based on the cophenetic correlation coefficient is used to select a cluster to represent a source region and/or signal subspace of interest. The cophenetic correlation coefficient is a measure of how faithfully a dendrogram modeled on underlying data preserves pairwise distances of original unmodeled data points. The clustered events are referred to herein as the design set.

The waveforms from the design events may then be aligned. In this example embodiment, the waveforms of the design events are aligned using a hybrid approach comprising course-scale alignment using multi-channel cross-correlation, followed by adaptive stacking of the waveforms. A design data matrix is thereafter automatically constructed from the aligned waveforms, with the aligned channel multiplexed data vectors forming the columns of the design data matrix.

Statistical parameters in the form of an initial value of an expected false alarm rate and/or an initial value of a detection threshold may be automatically determined using a sample correlation-based approach. A further statistical parameter in the form of a signal subspace dimension may be automatically determined by maximizing a probability of detection for the determined false alarm rate, according to the Neyman-Pearson criterion. The signal subspace bases may thereafter automatically be constructed from truncated left singular vectors of the design data matrix according to the calculated signal subspace dimension.

The signal subspace-based event detector may automatically be configured to detect seismic events based on the automatically calculated detection threshold and signal subspace bases. The event detector is then applied to the band-pass filtered data in a sliding time window manner, to detect events of interest, which may include weak microseismic events that are typically beyond the detection capability of methods such as correlation detectors and STA/LTA detectors.

A confidence indicator may be automatically calculated for each detected event. The onset times of the P- and S-wave arrivals of the newly detected events may be estimated using, for example, a transformed spectrogram approach (see, for example, the method described by Song F., Kuleli H. S., Toksöz M. N., Ay E., H. Zhang, "An Improved Method for Hydrofracture-Induced Microseismic Event Detection and Phase Picking," *Geophysics*, 75: A47-A52, 2010) The events of interest may finally be located using these estimated P- and S-wave arrivals.

Newly detected events may be added to the event library, and the signal subspace bases and/or one or more of the statistical parameters may automatically be recalculated based on such an updated event library.

A more detailed description of a system and method, in accordance with an example embodiment, follows with reference to FIGS. 1-7. The following description is with respect to microseismic monitoring of hydraulic fracturing, but note that the described systems and methods may be in play in any passive seismic monitoring.

FIG. 1 is a schematic view of an example system 100 to process seismic data to detect events of interest. The system 100 comprises an input interface 106 to receive time series data from a plurality of seismic sensors in the example form of geophones 408. The time series data is representative of seismic activity sensed by the geophones 408 and may include passive microseismic events in a subterranean formation.

The system 100 further comprises a memory 115 to store the time series data, and one or more processor(s) 103 that are communicatively coupled to the input interface 106 and/or the memory 115 to receive the time series data. In this example, the processor(s) 103 are provided by one or more computer(s), but in other embodiments, the processor(s) 103 and the respective functional subunits may be in the form of application-specific integrated circuits (ASICs). The system 100 includes an event detector 112 that is configured to process the time series data to detect seismic events of interest. The event detector 112 may be configured to perform signal subspace detection based, for example, on signal subspace bases defining the signal subspace of interest, and on one or more statistical parameters, such as a detection threshold, a signal subspace dimension, a false alarm probability value, and a detection probability value.

The system 100 further comprises a configuration module(s) 109 to automatically configure the event detector 112. The configuration module(s) 109 may be arranged to automatically construct an event library 124 of identified events, upon which construction of the signal subspace bases may be based. The configuration module(s) 109 may further automatically calculate one or more detection parameters, and may configure the event detector 112 for subspace event detection based on the automatically calculated parameters and the automatically constructed signal subspace bases. A display 121 may comprise a computer monitor or screen to display results of event detection.

A signal generator 118 may be provided to generate synthetic signals upon which at least initial values for one or more statistical parameters to be used by the event detector 112 is to be based. In other embodiments, the signal generator 118 may be provided by the configuration module(s) 109, such as, for example, in the example embodiment described below with reference to FIGS. 2 and 3.

The system 100 may yet further include a feedback module 127 to create a feedback loop based on events of interest identified by the event detector 112 and to facilitate automatic refinement by the configuration module(s) 109 of the detection parameters and/or the signal subspace upon which operation of the event detector 112 is based.

Figure 2:
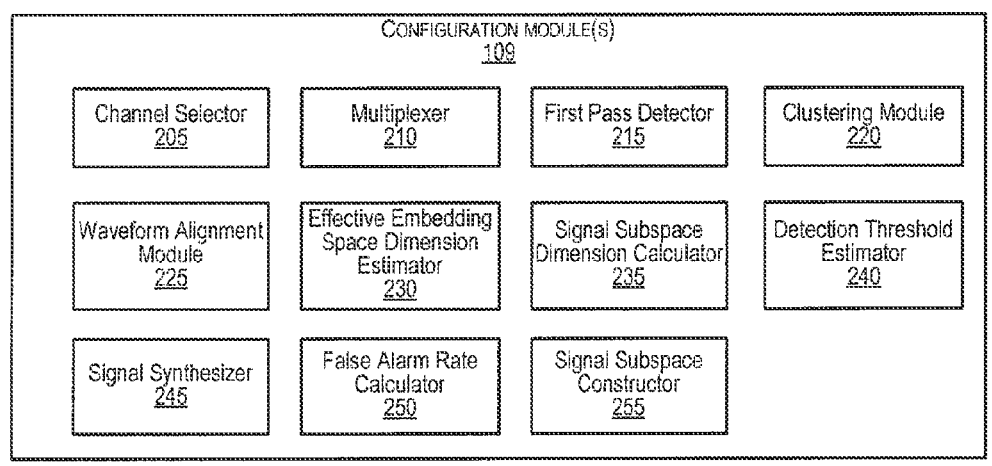
FIG. 2 is a schematic block diagram of a configuration module(s) forming part of a microseismic event detection system, in accordance with an example embodiment.

FIG. 2 is a schematic block diagram of an example embodiment of the configuration module(s) 109. In this example embodiment, the configuration module(s) 109 may include a channel selector 205 to select acceptable channels in time series data received from the geophones 408, and a multiplexer 210 to multiplex the multi-channel seismic data provided by the geophones 408 and to perform band-pass filtering on the data. The configuration module(s) 109 may further include a first pass detector 215 to perform initial detection of potential events indicated by the time series data.

A clustering module 220 may further be provided to perform clustering operations on the initially detected events. A waveform alignment module 225 may also form part of the configuration module(s) 109 to automatically align waveforms of the clustered initial events.

The configuration module(s) 109 may further comprise an effective embedding space estimator 230 to automatically estimate an effective embedding space dimension for the time series data, based in part on the identified noise in the time series data. The signal subspace dimension calculator 235 may further be provided to automatically calculate a value for the signal subspace dimension.

Instead of (or in addition to) a separate signal generator 118 (FIG. 1), the configuration module(s) 109 may yet further include a signal synthesizer 245 to generate synthetic data representing synthetic events in a location range of the subterranean region of interest. A detection threshold estimator 240 may be provided to automatically calculate a detection threshold based at least initially on the synthetic data. A false alarm rate calculator 250 and a signal subspace constructor 255 may further form part of the configuration module(s) 109, respectively to calculate at least an initial, false alarm rate value and to construct signal subspace bases that are to be used by the event detector 112 for the detection of events of interest in the time series data.

The functionalities of the configuration module(s) 109 will be described in greater detail below with reference to description of corresponding operations in a method 300 of FIG. 3.

Figure 3:
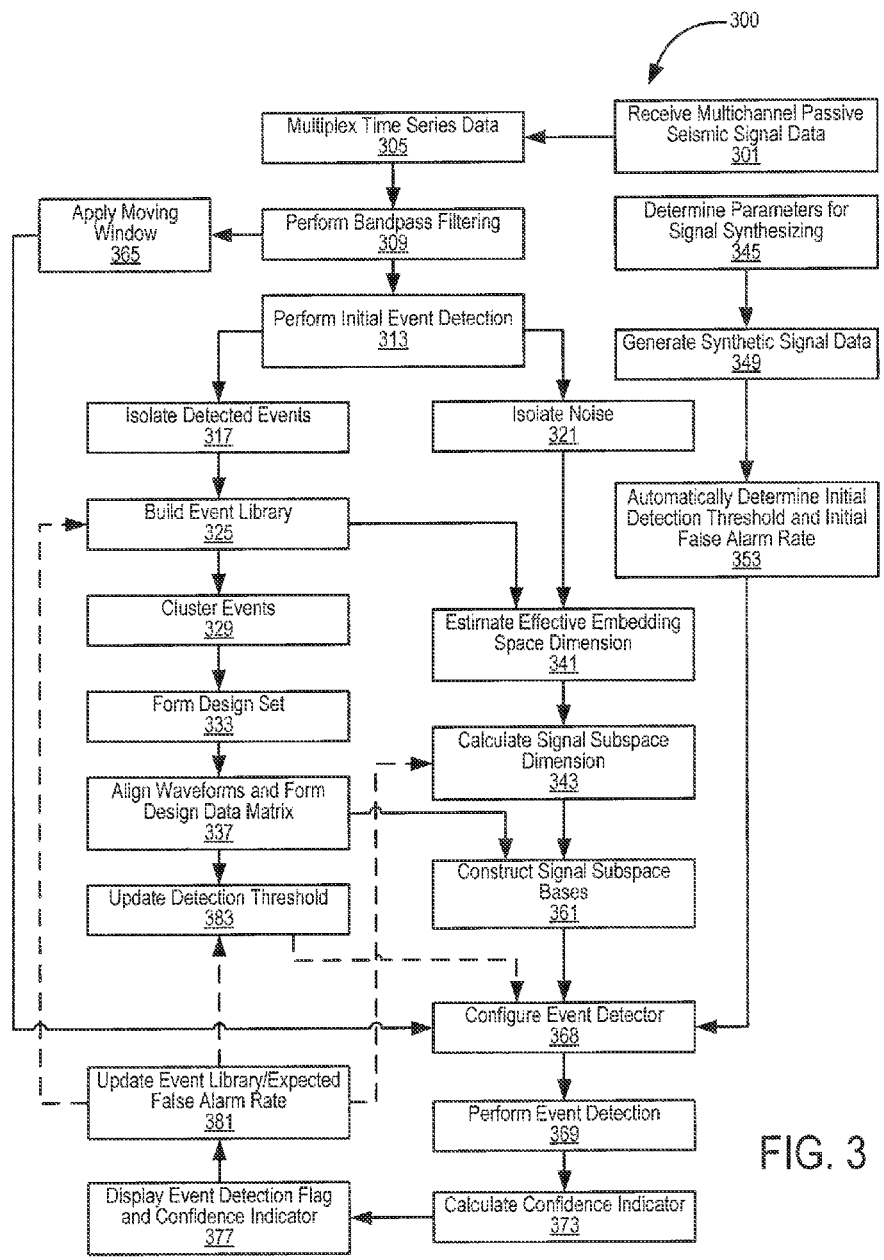
FIG. 3 is a schematic flow diagram of a method to detect microseismic events, in accordance with an example embodiment.
Figure 4:
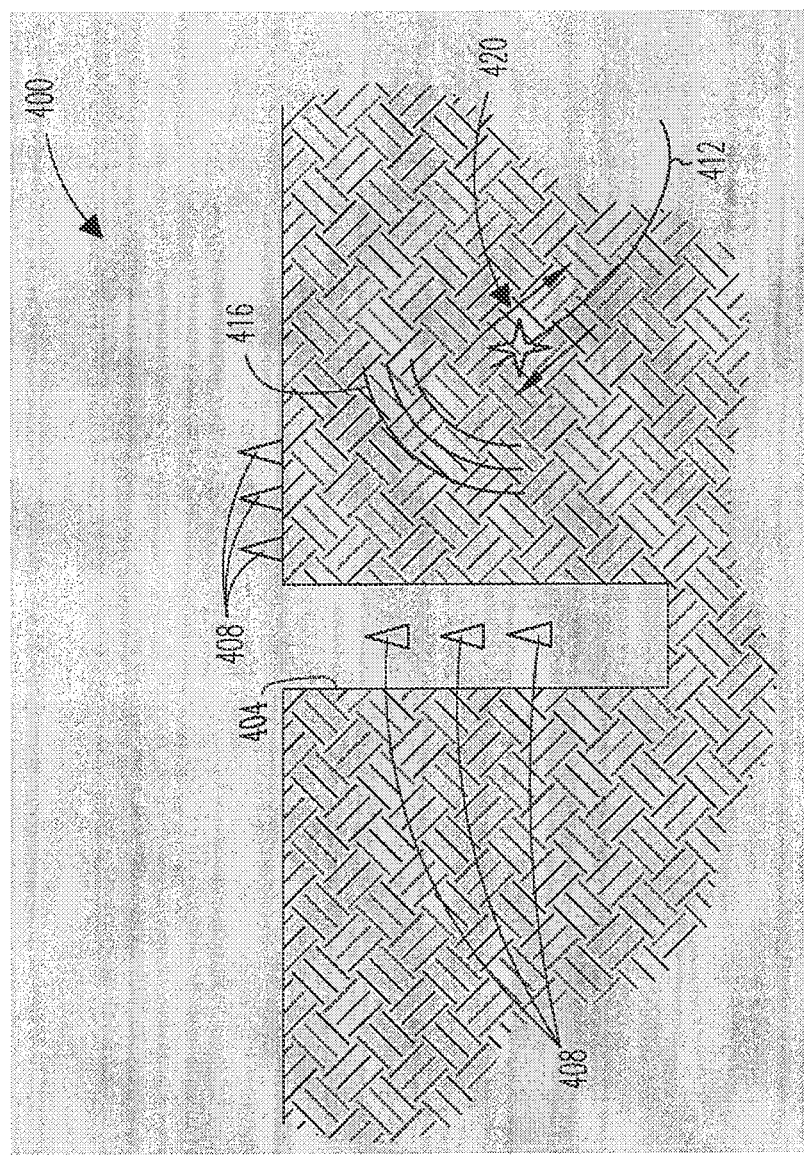
FIG. 4 is a schematic view, in elevation, of a subterranean formation and an array of seismic sensors to record seismic data, in accordance with an example embodiment.

FIG. 3 shows a schematic flow diagram of an example embodiment of a method 300 to detect microseismic events associated with a subterranean hydrocarbon reservoir (for example, by use of the example system 100). FIG. 4 shows an example measuring installation 400 to record seismic data with respect to seismic activity on a subterranean fracture system 412 that may be a new or pre-existing fracture system. Local stress perturbations on the fracture system 412 induce shear slippage and cause microseismic events 420 to occur. As a result, seismic energy that includes microseismic waves 416 are emitted and are recorded by arrays of seismic sensors in the example form of multi-component geophones 408 placed within a monitoring well 404 or at the surface. The recorded microseismic data provide time series data that are processed in order to monitor the reservoir. For example, in the context of hydraulic fracturing monitoring, the information of microseismic event location and density may be used to help optimize the fracturing treatment, such as to determine when to stop the treatment. Further, microseismic source studies may gain information on fracture in-situ stress state.

The recorded microseismic waves 416 may be embedded in strong noise, and the method 300 serves to distinguish indications of microseismic events in the time series data from noise. The noise may originate from various sources, such as pumping noise, tube wave noise and electronic noise. The time series data in the form of multi-channel data are recorded by the multi-component geophories 408 and are received by the system 100, at operation 301. The multichannel data are multiplexed, at operation 305, into a continuous stream according to the following equation:

$$x((n-1) \cdot N_c + i) = x_i(n) \quad (1)$$

wherein $x_i(n)$ is the n-th time sample from the i-th channel, where $n=1, 2, \ldots, N_T, i=1, 2, \ldots, N_c$.

For a three component (3C) geophone 408 array, channel data are multiplexed in order of both component index and geophone index. The multiplexing operation, at operation 305, may include filtering the channels to select only channels with an acceptable signal-to-noise ratio, and multiplexing only the selected channels. Channel selection may be performed automatically by the channel selector 205 based on a predetermined signal-to-noise ratio threshold.

A band-pass filter is thereafter applied to the multiplexed data, at operation 309, to remove as much as noise as practical in order to facilitate initial event detection, at operation 313. The initial detection is applied to the band-pass filtered multiplexed data to distinguish potential event signals from noise embedded in the time series data. In this example embodiment, initial event detection, at 313, is automatically performed by the first pass detector 215 that comprises a STA/LTA detector with a conservative threshold to reject as many false alarms as possible. Responsive to initial event detection, time series data corresponding to the detected events are isolated, at operation 317, to provide signal data; and time series data representative of the noise are isolated, at 321, to provide noise data.

The data indicative of the detected events are used to build an event library 124, at operation 325. The events in the event library 124 serve as templates to construct signal subspace bases that define the signal subspace with respect to which the event detector 112 is to operate. A template window length is selected to include both P- and S-wave arrivals. P-waves are primary waves that are compressional and are longitudinal in nature, while S-waves are shear waves that are transverse in nature.

Thereafter, the events in the event library 124 are clustered, at operation 329. In this example, the events are clustered based on correlation measurements. To this end, for all event pairs in the event library 124, waveform correlations may be calculated from the multiplexed data, and event dissimilarity matrix K may be constructed using the following equation:

$$K_{p,q} = 1.001 - \lambda_{p,q} \quad (2)$$

$K_{p,q}$ may be viewed as a measure of inter-event distance in waveform similarity space for events p and q, where $\lambda_{p,q}$ is the maximum waveform correlation between events p and q. The events in the event library 124 are then clustered based on the dissimilarity matrix K (operation 329). Various clustering algorithms may be used in different embodiments. The choice of clustering algorithm depends on objectives and expectations in characterizing a source. In the context of hydraulic fracturing, the assumption is often that the source region to be characterized through representative waveforms may have significant variation in source mechanisms, some variation in source time function and location, or some combination of all these attributes. This example embodiment therefore employs an aggressive algorithm for linking events into relatively extensive chains spanning the space of waveform variations, in the example form of a single-link method (proposed in H. Israelsson, "Correlation of Waveforms from Closely Spaced Regional Events," *Bulletin of the Seismological Society of America*, 80: 2177-2193, 1990).

The single-link clustering method begins by treating all events as individual clusters containing one event each. In each step of the clustering method, the minimum distance pair (i.e., largest correlation measurement) is selected, and the two clusters (events) to which it corresponds are merged. As two clusters are combined, the dissimilarity distances between the two clusters and any third remaining cluster are combined by selecting the smaller of the dissimilarity distance measurements to represent the inter-event distance of the new cluster with the third cluster. An updated dissimilarity matrix $K^g$ is formed to reflect the inter-event distance changes caused by the clustering. This process of aggregation continues until a single cluster remains. The clustering results are summarized by a dendrogram, which shows the successive fusions of events. At each clustering step, a cophenetic correlation coefficient (Cg) is calculated to measure how well the clustering models the actual similarity behavior, which is described in matrix K. Assuming that there are M events in the event library 124, the original dissimilarity matrix K has a size of M*M. The cophenetic correlation is computed as the correlation coefficient between K and Kg, for successive steps g=1, 2, ..., M−1, $$Cg = \frac{\sum_{q=1}^{N}\sum_{p=1}^{N} K_{p,q} K_{p,q}^{g}}{\left[\sum_{q=1}^{N}\sum_{p=1}^{N} K_{p,q} K_{p,q} \sum_{q=1}^{N}\sum_{p=1}^{N} K_{p,q}^{g} K_{p,q}^{g}\right]^{1/2}}. \quad (3)$$

As clustering progresses, the correlation between the Kg matrix and the original K matrix will continue to decrease as the original entries are replaced with the dissimilarity distances calculated for the growing clusters. Overall, values of Cg will thus decline.

The method may further comprise forming a design set, at operation 333, by selecting a subset of events from the event library 124. The design set is a set of events that are to be used to construct the signal subspace bases. Note that it may be desirable for the design set to comprise not only most of the larger events in the event library 124, but also to represent the actual inter-event correlation behavior described by the original dissimilarity matrix K. In this example embodiment, the clustering module 220 identifies and uses a largest drop in the cophenetic correlation as an automatic trigger to terminate clustering. The events that have been clustered up to that point are then automatically selected by the clustering module 220 for inclusion in the design set. The method 300 may further comprise checking waveform root-mean-square amplitudes of the automatically selected events to ensure that most of the larger events in the library are included.

In view of the computational load associated with the above-described cophenetic correlation method for event clustering and formation of the design set, other embodiments may employ a threshold or cutoff value for the maximum dissimilarity distance as a trigger to cease clustering. Only events with inter-event dissimilarity distance smaller than the threshold are included in the design set.

The method 300 thereafter comprises aligning the waveforms in the design set, at operation 337, and forming the design data matrix. In this example embodiment, the waveforms are automatically aligned using a hybrid approach that comprises first performing a coarse scale alignment based on the multi-channel cross correlation and thereafter performing a finer scale alignment using adaptive stacking. A known multi-channel cross correlation method to determine relative phase arrival times for teleseismic events recorded by a local or regional network (e.g., as described by VanDecar & Crosson, "Determination of teleseismic relative phase arrival times using multi-channel cross correlation and least squares," *Bulletin of the Seismological Society of America,* 80:150-169, 1990) is adapted for use by the waveform alignment module 225 to estimate and correct for inter-event delays.

An assumption in prior procedures that use cross-correlation is that the waveforms of different events have a similar shape. However, waveform variability in the design set may be beneficial in constructing signal subspace bases for a subspace event detector 112. The present example embodiment therefore employs the multi-channel cross-correlation method for the initial alignment, whereafter an adaptive stacking method is applied for finer scale alignment. The adaptive stacking method is more tolerant of significant waveform variability, since a reference trace of the adaptive stacking method tends to average out waveform differences.

Figure 5:
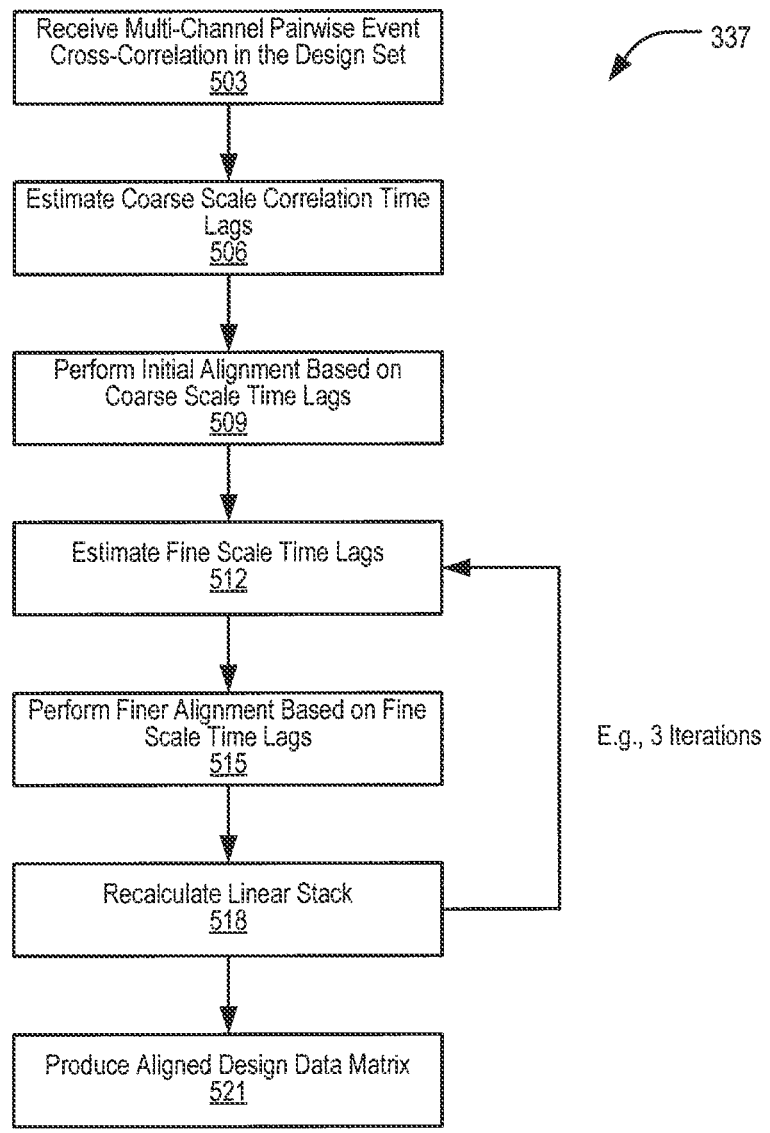
FIG. 5 is a schematic flow diagram of an example method to produce an aligned design data matrix from multichannel seismic data.
Figure 6:
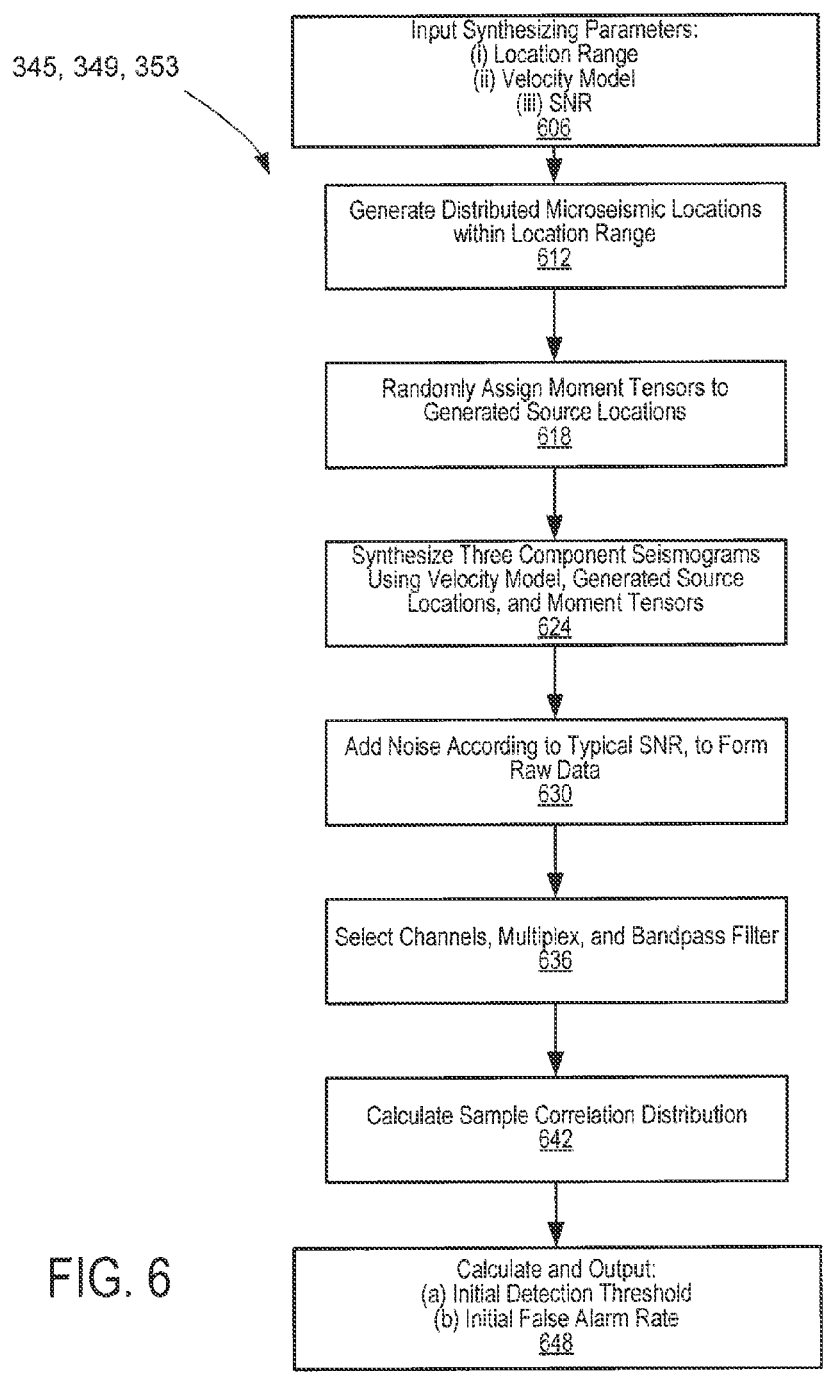
FIG. 6 is a schematic flow diagram of an example method to synthesize data and to calculate one or more statistical parameters for use in automated signal subspace event detection, based on the synthesized data.
Figure 7:
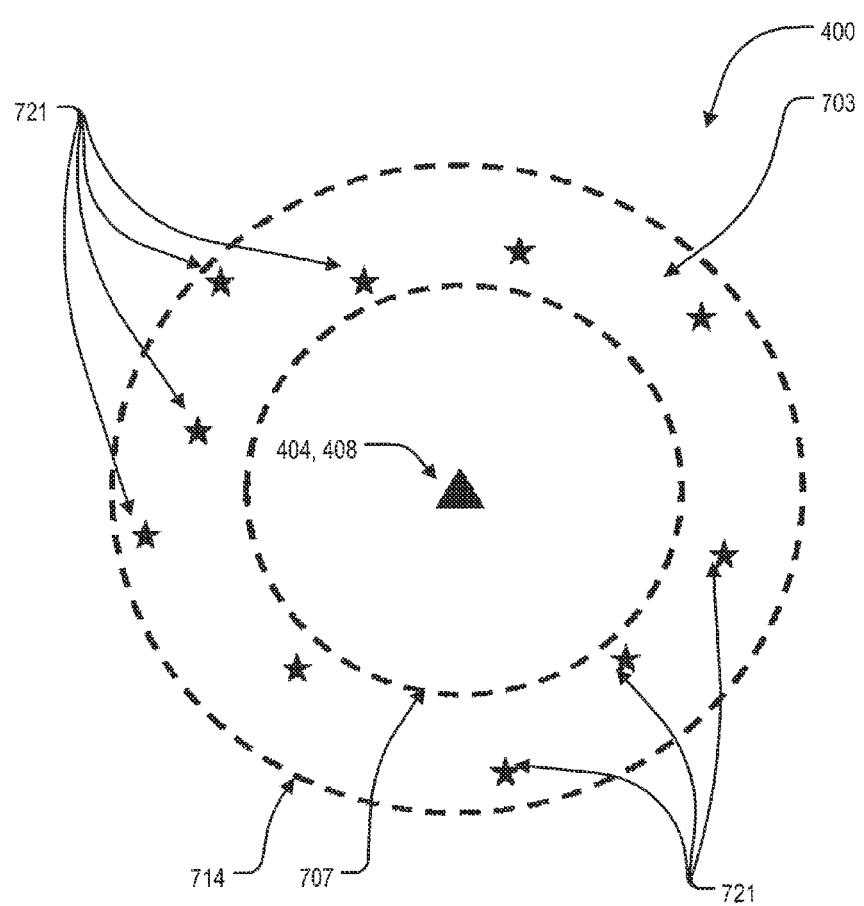
FIG. 7 is a schematic plane view of uniformly distributed synthetic events in a target range from a monitoring well, in accordance with an example embodiment.

The hybrid waveform alignment operation 337 is described in greater detail with reference to FIG. 5.

The waveform alignment operation 337 commences with receiving, at 503, the multichannel pairwise event cross correlation data calculated in the clustering operation 329 (FIG. 3). The cross-correlation data may comprise relative time lags or time delays and maximum correlation values. In this description, $s_p(t)$, $s_q(t)$ denotes the channel multiplexed data for the design set events p and q. A relative delay time $\Delta t_{pq}$ and a maximum cross-correlation $\lambda_{pq}$ between $s_p(t)$ and $s_q(t)$ are derived during operation 329. The hybrid waveform alignment operation 337 may comprise estimating coarse scale correlation time lags, at operation 506. For D design set events, the coarse scale inter-event time lags $t_p$ may be estimated as the least squares solution of the $$\frac{D(D-1)}{2} + 1$$

over-determined equations given by $$t_p - t_q = \Delta t_{pq}; \Sigma_{p=1}^{D} t_p = 0 \quad (4)$$

In matrix form, the system can be expressed as $$At = \Delta t \quad (5)$$

Wherein:
the D length solution vector t represents the optimized inter-event time lags (with zero mean);
Δt is the $$\frac{D(D-1)}{2} + 1$$

length data vector of cross-correlation derived relative delay times; and
A is a sparse coefficient matrix with a size of $$\left[\frac{D(D-1)}{2} + 1\right] \times D.$$

Considering the varying quality of observations, a diagonal weighting matrix W may be added. The system (5) then becomes $$WAt = W\Delta t \quad (6)$$

W may be chosen to weight each equation by its associated cross-correlation coefficient $\lambda_{pq}$. An alternative approach may be via a weighted function of equation residuals from the previously determined unweighted estimate, $$res_{pq} = \Delta t_{pq} - (t_p - t_q) \quad (7)$$

In this example embodiment, the weighting scheme based on the cross-correlation coefficient is used due to its greater computational efficiency. The weighted least-squares solution serves as the coarse scale estimate of inter-event time lags (operation 506), $$t_w = (A^T W A)^{-1} A^T W \Delta t \quad (8)$$

The standard deviation of the residuals associated with the unweighted least squares solution (where W is the identity matrix) provides a reliable, if somewhat pessimistic, estimate of RMS (root mean square) timing uncertainty, $$\sigma_p^{res} = \sqrt{\frac{1}{D-2}\left[\sum_{q=1}^{p-1} res_{pq}^2 + \sum_{q=p+1}^{D} res_{pq}^2\right]}. \quad (9)$$

After the initial alignment using the coarse scale time lags $\{t_{wp}\}$, at operation 509, a linear stack $s_1(t)$ may be calculated across the full suite of D design events in the design set as:

$$s_1(t) = \frac{1}{D}\sum_{p=1}^{D} s_p(t + t_{wp} - t_w^{ref}). \quad (10)$$

In equation (10), $t_w^{ref}$ is the inter-event time lag estimate of an arbitrary reference event. The linear stack $s_1(t)$ represents an estimate of the typical waveform across all events and may be used as a stacked trace for direct minimization of the respective time-lags, as described below. Fine scale time lags $\{\tau_p\}$ may thereafter be estimated (operation 512) by, for each design event $s_p(t)$, obtaining an optimum match with the stacked trace $s_1(t)$ through performance of a direct search over fine scale time lags $\tau_p$ to minimize an $L_a$ measure of misfit, defined by:

$$0_a = \Sigma_t |s_1(t) - s_p(t + t_{wp} - t_w^{ref} - \tau_p)|^a \quad (11)$$

The fine scale time lags $\tau_p$ be restricted to a specified search interval to limit the computational effort of evaluating the misfit for each discrete time-shift. In this example embodiment, a reasonable search interval $-\sigma_p^{res} < \tau_p < \sigma_p^{res}$ is used.

Once the fine scale time lags $\{\tau_p\}$ have been estimated for all the events, the composite time corrections $\{t_{wp} - t_w^{ref} - \tau_p\}$ may be applied to each event to improve alignment by performing finer alignment based on the fine scale time lags, at operation 515. The linear stack may thereafter be recalculated with the revised time adjustments, at operation 518. The new stacked trace $s_1'(t)$ represents an improvement on the initial stack. The fine-scale alignment procedure may be repeated for each event in the design set, using the new stack, to produce an improved estimate of the fine scale time lags $\{\tau_p\}$. The process is iterated until an accurate and stable waveform alignment is achieved. The convergence speed is dependent on the choice of the variable a. A value of 3 for the variable a has been found to be effective, resulting in rapid convergence of the iterative process. Applicants have found that stable results may be achieved in three iterations.

For each event in the design set, the aligned channel-multiplexed data vector may be written as:

$$\underline{s}(n) = [s_1(n)s_2(n)\ldots s_{N_c}(n)s_1(n+1)s_2(n+1)\ldots s_{N_c}(n+N_T-1)]^T \quad (12)$$

The total number of samples comprising $\underline{s}(n)$ is $N = N_c \cdot N_T$. The design data matrix $$\underline{S} = [\underline{s}^1(n)\underline{s}^2(n)\ldots \underline{s}^D(n)] \quad (13)$$

is assembled (step 521 of operation 337) with D channel-multiplexed column vectors (equation (12)), with one for each event in the design set. To prevent large events in the design set from dominating the design data matrix, data from each event may be normalized to have unit energy, that is, $$\underline{s}^{iT}(n)\underline{s}^i(n) = 1, i = 1, 2, \ldots, D \quad (14)$$

Returning now to FIG. 3, the recorded channel multiplexed data may be scanned, at operation 365, using a time-sliding window for event detection. The data within each window may be presented as:

$$\underline{x}(n) = [x_1(n)x_2(n)\ldots x_{N_c}(n)x_1(n+1)x_2(n+1)\ldots x_{N_c}(n+N_T-1)]^T \quad (15)$$

Before continuing description of the method 300 of FIG. 3, the theoretical background of a statistical analysis on which configuration of the event detector 112 and event detection may be based will be briefly discussed. The event detection performed by the event detector 112 may be posed as a binary hypothesis testing problem:

$$\begin{cases} \underline{x}(n) = \underline{\eta} & \text{under hypothesis } H_0 \\ \underline{x}(n) = \underline{s} + \underline{\eta} & \text{under hypothesis } H_1 \end{cases} \quad (16)$$

The noise $\underline{\eta}$ (e.g., the noise isolated in operation 321) may be assumed to be zero-mean, and temporally and spatially uncorrelated with an unknown variance $\sigma^2$. The signal $\underline{s}$ may be assumed to be deterministic but dependent upon a vector of unknown parameters $\underline{a}$, and is expressed as an unknown linear combination of basis waveforms:

$$\underline{s} = \underline{U}\underline{a} \quad (17)$$

where the N×d matrix $\underline{U}$ represents d unknown signal subspace bases. The signal subspace dimension d may take any value from 1 to N. Without losing generality, $\underline{U}$ can be made orthonormal:

$$\underline{U}^T\underline{U} = I_d \quad (18)$$

Therefore, energy captured in the signal subspace may be simplified to $$E_c = \underline{a}^T\underline{a} \quad (19)$$

Under the above assumptions, the probability function for the recorded data is $$p(\underline{x}(n)|H_0) = \left[\frac{1}{2\pi\sigma^2}\right]^{N/2} \exp\left(-\frac{1}{2\sigma^2}\underline{x}^T(n)\underline{x}(n)\right) \quad (20)$$

under the null hypothesis $H_0$ (to event present), and $$p(\underline{x}(n)|H_1) = \left[\frac{1}{2\pi\sigma^2}\right]^{N/2} \exp\left(-\frac{1}{2\sigma^2}(\underline{x}(n) - \underline{U}\underline{a})^T(\underline{x}(n) - \underline{U}\underline{a})\right) \quad (21)$$

under the alternative hypothesis $H_1$ (event present).

It follows that the log generalized likelihood ratio may be provided by:

$$l(\underline{x}(n)) = \ln(\Lambda(\underline{x}(n))) = \ln\left[\frac{\max_{\{a,\sigma\}} p(\underline{x}(n)|H_1)}{\max_{\{\sigma\}} p(\underline{x}(n)|H_0)}\right] = -\frac{N}{2}(1 - c(n)) \text{ where } c(n) = \frac{\underline{x}_p^T(n)\underline{x}_p(n)}{\underline{x}^T(n)\underline{x}(n)}, \quad (22)$$

and $\underline{x}_p(n) = \underline{U}\underline{U}^T\underline{x}(n)$ is the projection of the recorded data into the signal subspace defined by $\underline{U}$, and is the least-squares estimate of the signal in the detection window. The ratio of energy in the projected signal (i.e., the signal subspace) to the energy in the original data is represented by the quantity c(n). It is a positive quantity with values ranging between 0 and 1. The generalized likelihood ratio test detects an event of interest if the log generalized likelihood ratio exceeds a certain threshold α, therefore if $$l(\underline{x}(n)) = -\frac{N}{2}(1 - c(n)) > \alpha \quad (23)$$

This means that if the quantity c(n) for a particular detection window is larger than a detection threshold γ, an event is detected in that window, $$c(n) = \frac{\underline{x}_p^T(n)\underline{x}_p(n)}{\underline{x}^T(n)\underline{x}(n)} > \gamma \quad (24)$$

Event detection based on equation (24) therefore returns a positive result if the ratio of the energy in a signal subspace derived from the design data matrix to the total signal energy exceeds the detection threshold γ.

The quantity c(n) may serve as the sufficient statistic for a subspace detector (such as, for example, the event detector 112) under assumption of a multivariate Gaussian probability model for the data. The numerator of c(n), normalized by the noise variance, $\underline{x}_p^T(n)\underline{x}_p(n)/\sigma^2$, is chi-square distributed with d degrees of freedom. Under hypothesis $H_0$, the quantity $\underline{x}_p^T(n)\underline{x}_p(n)/\sigma^2$ is a central chi-square variable, while under hypothesis $H_1$, it is a non-central chi-square variable with non-centrality parameter of $\underline{a}^T\underline{a}/\sigma^2$. The denominator of the sufficient statistic $$\underline{x}^T(n)\underline{x}(n) = \underline{x}_p^T(n)\underline{x}_p(n) + \underline{w}^T(n)\underline{w}(n),$$

$$\underline{w}(n) = (I_N - \underline{U}\underline{U}^T)\underline{x}(n) \quad (25)$$

is the sum of two statistically independent terms. The first term $\underline{x}_p^T(n)\underline{x}_p(n)$, the same as the numerator, represents the energy in the data projected into the signal subspace, and the second term $\underline{w}^T(n)\underline{w}(n)$ denotes the energy in the orthogonal complement of the signal subspace. When normalized by the noise variance $\sigma^2$, both of these terms are chi-square distributed. The first term has d degrees of freedom, and the second term has N-d degrees of freedom.

In order to perform signal subspace detection of the time series data based on comparison of the sufficient statistic c(n) to the detection threshold, it is necessary to construct the signal subspace bases $\underline{U}$ and determine the detection threshold value γ.

The objective in constructing a subspace representation e.g., in the example form of the signal subspace bases) for the subspace detector 112 is to obtain acceptably accurate orthogonal bases for seismic signals characteristic of events of interest in the target source region. A representation with a larger dimension provides a higher possibility of detecting weak events by capturing more of the energy of an incompletely known signal. However, a higher order dimension representation may also be expected to increase the false alarm rate by allowing the detector to match noise with great probability. Consequently, a parsimonious representation with an adequate signal energy capture is desired. For a given representation order of d, the signal subspace bases $\underline{U}$ should capture as much energy in the design data matrix $\underline{S}$ as possible.

The singular value decomposition (SVD) of the design data matrix $\underline{S}$ $$\underline{S} = \underline{W}\Sigma\underline{V}^T = \underline{W}\underline{A} \quad (26)$$

where $\underline{A} = \Sigma\underline{V}^T$ is the representation coefficient matrix. According to the Eckart-Young theorem (see, for example, C. Eckart and G. Young, "The Approximation of One Matrix by Another of Lower Rank," and *Psychometrika*, vol. 1, pp. 211-218, (1936)), the best approximation to $\underline{S}$ in the least-squares sense for a given order d is the truncated SVD of the matrix to the rank d. Consequently, $$\underline{S} = \underline{W}\underline{A} = [\underline{W}_d \quad \underline{W}_{D-d}]\begin{bmatrix} \Sigma_d & 0 \\ 0 & \Sigma_{D-d} \end{bmatrix}\begin{bmatrix} \underline{V}_d^T \\ \underline{V}_{D-d}^T \end{bmatrix} \sim \underline{W}_d\Sigma_d\underline{V}_d^T = \underline{U}\underline{A}_d \quad (27)$$

$$\underline{U} = \underline{W}_d \quad (28)$$

$$\underline{A}_d = \Sigma_d\underline{V}_d^T \quad (29)$$

The matrix of coefficients $\underline{A}_d$ provides an expression of the energy capture of the d-dimensional representation for the events of the design set. Consider, for example, the i-th event:

$$\underline{s}^i \sim \underline{U}\underline{a}_d^i \quad (30)$$

where $\underline{a}_d^i$ is the i-th column of $\underline{A}_d$. The fractional energy capture for this event is:

$$f_c^i = [\underline{a}_d^{iT}\underline{a}_d^i]/[\underline{s}^{iT}(n)\underline{s}^i(n)] = \underline{a}_d^{iT}\underline{a}_d^i \quad (31)$$

The average fraction of energy captured for all D events in the design set may accordingly be calculated as:

$$\overline{f}_c = \frac{1}{D}\sum_{i=1}^{D} f_c^i = \text{trace}(\Sigma_d^T\Sigma_d)/\text{trace}(\Sigma^T\Sigma). \quad (32)$$

The fractional energy capture for each of the D events and the average fraction of energy captured for all D events may be plotted as a function of the dimension of representation d, also referred to as the signal subspace dimension. Each fractional energy capture curve extends from 0 to 1, and increases with increased dimension of representation. When d reaches a certain value, the average fraction of energy captured for all design events exceeds a predetermined threshold (e.g., 90%). This may, in some embodiments, be used as an aid to determining d. Determining the signal subspace dimension d by generating and processing plots, as described above, requires a considerable amount of operator intervention and effort. As described elsewhere herein, some example embodiments in accordance with this disclosure provide automated calculation or estimation of the signal subspace dimension (d).

Returning for the moment to the theoretical underpinnings of the example embodiment, one method of calculating the signal subspace dimension d and the detection threshold value γ comprises studying the distribution of the sufficient detection statistic c(n). A known method for setting d and γ is the Neyman-Pearson criterion (see, for example, Van Trees H. L., "Detection, Estimation and Modulation Theory," vol. 1, John Wiley and Sons (1968)). In accordance with this criterion, a probability of false alarm is fixed at an acceptable value and the probability of detection is maximized by adjusting the remaining free parameters: the signal subspace dimension and the detection threshold. Because $\underline{x}_p^T(n)\underline{x}_p(n)/\sigma^2$ and $\underline{w}^T(n)\underline{w}(n)/\sigma^2$ are chi-square distributed with d and N-d degrees of freedom respectively, c(n) in equation (24) may be transformed into a F distributed variable as follows:

$$\begin{cases} c'(n) = \dfrac{(x_p^T(n)x_p(n)/\sigma^2)/d}{(w^T(n)w(n)/\sigma^2)/(N-d)} = \dfrac{c(n)}{1-c(n)}\dfrac{N-d}{d} > \dfrac{\gamma}{1-\gamma}\dfrac{N-d}{d} & H_1 \\ c'(n) = \dfrac{(x_p^T(n)x_p(n)/\sigma^2)/d}{(w^T(n)w(n)/\sigma^2)/(N-d)} = \dfrac{c(n)}{1-c(n)}\dfrac{N-d}{d} < \dfrac{\gamma}{1-\gamma}\dfrac{N-d}{d} & H_0 \end{cases} \quad (33)$$

Therefore, the variable c'(n) is F distributed. Under the hypothesis $H_0$, c'(n) has a central F distribution with d and N-d degrees of freedom. Under the hypothesis $H_1$, c'(n) has a doubly non-central F distribution with the same numbers of degrees of freedom and a non-centrality parameter ($\bar{f}_c E/\sigma^2$, $(1-\bar{f}_c)E/\sigma^2$), where E is the signal energy over detection window of length N. In terms of signal to noise ratio (SNR) defined as $$SNR = E/\sigma^2/N \quad (34)$$

the non-centrality parameter for c'(n) under $H_1$ may also be written as $$(\bar{f}_c \cdot N \cdot SNR, (1-\bar{f}_c) \cdot N \cdot SNR).$$

A probability of false alarm $P_F$ (also referred to herein as the false alarm rate) may be determined by the probability that c'(n) exceeds $$\frac{\gamma}{1-\gamma}\frac{N-d}{d}$$

under $H_0$, and a probability of detection $P_D$ may be calculated as the probability that c'(n) exceeds $$\frac{\gamma}{1-\gamma}\frac{N-d}{d}$$

under $H_1$. Therefore, $$\begin{cases} 1 - F_{d,N-d}\left(\dfrac{\gamma}{1-\gamma}\dfrac{N-d}{d}\right) = P_F \\ 1 - F_{d,N-d}\left(\dfrac{\gamma}{1-\gamma}\dfrac{N-d}{d}, \bar{f}_c \cdot N \cdot SNR, (1-\bar{f}_c) \cdot N \cdot SNR\right) = P_D \end{cases} \quad (35)$$

where F(·) is the cumulative distribution function of F-distribution. Note that equation (35) may be used to determine d and γ, for example by maximizing $P_D$ for a given false alarm rate $P_F$.

Thus far, it has been assumed that the effective embedding space dimension in the detection windows is equal to the number of samples N in that window. However, a significantly lower effective embedding space dimension (denoted $\hat{N}$) may be used if the data are band-pass filtered before detection (see, for example, Wiechecki-Vergara, S., H. L. Gray, and W. A. Woodward, "Statistical. Development in Support of CTBT Monitoring," *DTRA report DTRA-TR*-00-22, 8725 John J. Kingman Road, Mail Stop 6201, Fort Belvoir, Va. 22060-6201, 2001). Note that, even without filtering, background noise is typically correlated since the noise spectra are normally not flat and data recorded by a 3C geophone 408 array (as is the case in this example) are spatially correlated. Wiechecki-Vergara et al. provides a method to estimate the effective dimension of the time series data based on distribution of a sample correlation coefficient computed from a large number of length-N samples of background noise and detected event signals.

Returning briefly to FIG. 3, the method 300 may include estimating the effective embedding space dimension ($\hat{N}$), at operation 341 (for example, by use of the effective embedding space dimension estimator 230). In this operation, noise samples may be obtained by dividing a very long, continuous noise record chosen to be free of seismic events into many hundreds or thousands of length-N data windows. Event signals to be used for estimating the effective embedding space dimension, at operation 341, may be obtained from the initial event detection (operation 313). As will be seen from what follows, events of interest identified by the event detector 112 and added to the event library 124 by the feedback module 127 may, in further iterations, be used in estimating the effective embedding space dimension, at 341. In operation 341, the effective embedding space dimension $\hat{N}$ is automatically related to the variance of the sample correlation coefficient $\hat{c}_{ij}$ between event signal $s^i$ and noise data $\eta^j$ $$\hat{c} = \frac{s^{iT}\eta^j}{\sqrt{(s^{iT}s^i)(\eta^{jT}\eta^j)}} \quad (36)$$

by $$\hat{N} = 1 + 1/\sigma_{\hat{c}}^2 \leq N \quad (37)$$

Considering a decrease in the effective embedding space dimension, equation (35) may be rewritten as:

$$\begin{cases} 1 - F_{d,\hat{N}-d}\left(\dfrac{\gamma}{1-\gamma}\dfrac{\hat{N}-d}{d}\right) = P_F \\ 1 - F_{d,\hat{N}-d}\left(\dfrac{\gamma}{1-\gamma}\dfrac{\hat{N}-d}{d}, \bar{f}_c \cdot N \cdot SNR, (1-\bar{f}_c) \cdot N \cdot SNR\right) = P_D \end{cases} \quad (38)$$

Equation (38) gives the average probability of detection for the events in the design set assuming the design events are all equally likely. It is assumed that the signals in the design set span the range of signals produced by the source of interest. The calculated average probability of detection $P_D$ in Eq. (38) also indicates the detection probability for all possible events from this source region.

According to equation (38), assuming a given false alarm rate $P_F$, the detector threshold γ can be related to the signal subspace dimension d. Therefore, for a given false alarm rate $P_F$ or detection threshold γ, the average probability of detection $P_D$ over a SNR range of interest is a sole function of the signal subspace dimension d. A value for the signal subspace dimension d is thus to be determined.

The method 300 includes automated calculation or estimation of the signal subspace dimension d, based in this example on identification of a peak contribution to the average probability of detection in terms of the increase in the signal subspace dimension. It is found that, initially, the curves for the probability of detection $P_D$ climb quickly with increases in d, because added signal subspace dimensions significantly increase the signal energy capture in the signal subspace. The probability of detection curves continue to improve until d reaches a certain value. Beyond that value, the detection probability actually decreases. A reason for this phenomenon is that a marginal increase in signal energy capture afforded by additional increments to the signal subspace representation beyond the peak value does not offset an associated increase in noise energy capture. In this example embodiment, the signal subspace dimension d is automatically determined by the signal subspace dimension calculator 235, at operation 343, by maximizing the sum of the detection probability over a SNR range of interest ($SNR_{min}$–$SNR_{max}$), that is:

$$d = \underset{\{d\}}{\mathrm{argmax}}\left\{\sum_{SNR=SNR_{min}}^{SNR_{max}} P_D(d, SNR)\right\}, \text{ for a given } P_F \text{ or } \gamma. \quad (39)$$

In the example embodiment described with reference to FIG. 3, the signal subspace dimension may be calculated in accordance with the equation (39) based on the signal-to-noise ratio range estimated from initial event detection at operation 313. In other embodiments, the SNR range used in automatically determining the signal subspace dimension may be provided as a predefined user input.

Following determination of the signal subspace dimension d (e.g., at 343), the detector threshold γ may also be determined with equation (38), if the false alarm rate $P_F$ is known.

In some embodiments, the false alarm rate may be established with a trial-and-error approach. In such embodiments, a user may, in advance, provide a chosen false alarm rate as an initial user input, and the method may comprise, subsequent to operation 343, automatically calculating the detection threshold γ based on equation (38), and thereafter proceed to construct signal subspace bases (operation 361) and perform event detection (operation 369). An operator may thereafter iteratively vary the false alarm rate by assessing the accuracy of resultant event detection. Such a trial-and-error approach may, however, be time consuming.

In this example embodiment, an automated approach based on sample correlations of synthetic data is proposed to form an initial estimate of the false alarm rate $P_F$ and detection threshold γ. This automated approach is premised on the observation that false alarms are most likely to occur among unrelated events originating at similar distances from the observing geophones 408, because the phases in the corresponding seismograms will typically be approximately aligned. Therefore, an initial detection threshold γ of the subspace detector 112 may automatically be estimated to be significantly higher than an empirical distribution of correlation values formed from an ensemble of synthetic seismic events at approximately the same distance from the monitoring well. A detection threshold estimator 240 forming part of the configuration module(s) 109 may thus automatically set an initial value for the detection threshold to a multiple of a maximum sample correlation value of the synthetic events. The initial detection threshold may automatically be estimated at between three and five times the maximum sample correlation value, Which in this example embodiment is automatically set at four times the maximum sample correlation value of the synthetic events.

The method 300 may therefore include the operations of determining parameters for signal synthesizing, at 345, generating synthetic signal data, at operation 349, and automatically determining the initial detection threshold γ and the initial false alarm rate, at 353, $P_F$. A more detailed description of operations 345-353, in accordance with the example embodiment, follows below with reference to FIGS. 6 and 7. Note that the sequence of operations described with reference to FIG. 6 may, in other embodiments, be performed in a different order.

In this example embodiment, automatic determination of the detection threshold γ commences with providing, at operation 606, pre-job design input to a signal synthesizer 245 forming part of the configuration module(s) 109. The pre-job design input may comprise the possible microseismic location range, a velocity model for the region of interest, and a typical SNR ratio.

The possible microseismic location range, also referred to herein as the target range, is provided to cause the generation by the signal synthesizer 245 of synthetic events that are at a functionally similar distance from the observing geophones 408 as the non-synthesized microseismic events that are to be detected. The location range may also include a depth range that defines vertical limits within which the synthetic events are to be generated. In the setup of multi-stage hydro-fracturing, as is the case in the present example embodiment, location range information can be obtained from the microseismic event locations of preceding stages. In the current example, shown schematically in FIG. 7, possible microseismic location range 703 is an annular zone that, when seen in plane view (FIG. 7, in which the arrangement is, for example, viewed in a horizontal plane), extends 360° and is radially bounded by two conceptual concentric circles that have their centers at the observing geophones 408 and lie on an inner radius 707 and an outer radius 714, respectively. Although not shown in FIG. 7, note that there may also be a depth boundary for the possible microseismic location range.

Distributed microseismic locations within the microseismic location range 703 are thereafter generated, at operation 612. As can be seen with reference to FIG. 7, the locations of synthetic events 721 are, in this example, uniformly distributed within the annular location range 703, and are also uniformly distributed along the vertical axis between upper and lower depth boundaries. In this context, "uniform distribution" means the distribution of a random variable in which each value has the same probability of occurrence. The event locations are thus generated randomly, typically resulting in a random non-repeating distribution, to achieve statistically significant results of sample correlations.

A moment tensor is then randomly assigned, at operation 618, to each synthetic event 721, to promote representation of most, if not all, possible source mechanisms. Thereafter, 3C seismograms comprising waveforms representative of the synthetic events 721 may be synthesized, at operation 624. In this example embodiment, the signal synthesizer 245 is configured to generate the synthetic events 721 by use of the finite difference method if the operator-provided velocity model is a three-dimensional model. If, however, a one-dimensional velocity model is provided, a fast semi-analytical discrete wavenumber integration method may be used. (See, for example, M. Bouchon, "Discrete wave number representation of elastic wave fields in three-space dimensions," *Journal of Geophysical Research*, 84: 3609-3614, 1979)

Once the raw 3C data are synthesized, at 624, a reasonable amount of noise is added, at operation 630, according to a signal-to-noise ratio value that is typically seen in relevant field datasets and that is provided by the operator as an initial input (at 606).

Thereafter, channel selection, multiplexing, and band-pass filtering operations are applied, at operation 636. Channel selection, multiplexing, and filtering of the synthesized data, at 636, may be performed similarly or identically to the corresponding operations performed for the non-synthesized time series data, as described above with reference to operations 305 and 309 of method 300 (FIG. 3). In some embodiments, the channel selector 205, the multiplexer 210, and a common band-pass filter may be used for processing both the synthesized and non-synthesized data. Next, sample correlation distribution of the synthetic events 721 is calculated, at operation 642, by calculating sample correlation values between all possible synthetic event pairs. Note that the sample correlation distribution is not particularly sensitive to the total number of synthetic events in the synthesized data. However, this example embodiment comprises typically generating a few tens of synthetic events 721 to promote comprehensive coverage of possible locations and source mechanisms.

Initial values for the detection threshold γ and the false alarm rate $P_F$ are thereafter automatically calculated, at operation 648. The initial value of the detection threshold γ may automatically be set by the detection threshold estimator 240 at three to five times the maximum sample correlation value, and in this example is set at four times the maximum sample correlation value. An initial estimate of the false alarm rate $P_F$ is thereafter obtained by the false alarm rate calculator 250, based on equation (38) and using previously calculated $\hat{N}$ (at 341, FIG. 3), and d (at 343).

Returning now to FIG. 3, note that initial values for a number of statistical parameters to be used in the signal subspace event detection by the event detector 112 has been derived by automatic calculation at this point of the method 300. In this example, all of the statistical parameters that are needed for at least initial signal subspace event detection (e.g., the false alarm rate $P_F$, the detection threshold γ, and the signal subspace dimension d) has been calculated automatically. These parameters are referred to herein as "statistical parameters" because they are not inherent to the time series data, the event source region, or the event of interest, but are instead parameters to calibrate or configure signal subspace event detection based on a statistical investigation (e.g., the statistics-based binary hypothesis test described with reference to the example embodiments).

The method 300 may further comprise automatically constructing the signal subspace bases, at operation 361 (for example, by use of the signal subspace constructor 255). Signal subspace construction is, in this example, based on obtaining the signal subspace bases $\underline{U}$ from the SVD of the design data matrix $\underline{S}$ (equation (28)), based on the automatically derived signal subspace dimension d (at 343).

The method 300 may thereafter comprise configuring the event detector 112, at operation 368, to detect events of interest in the time series data based on the automatically calculated/derived statistical parameters (e.g., $P_F$, γ, and d) and the automatically constructed signal subspace bases. Note that the operation of configuring the event detector 112, as indicated by block 368 in FIG. 3, may not necessarily comprise an explicit, separate step in a sequence of operations, but may be performed automatically during the calculation of the statistical parameters and the signal subspace bases. In such embodiments, the configuration module(s) 109 may form an integrated part of the event detector 112.

A moving window analysis of the band-pass filtered data may thereafter be performed, at operation 369, by the event detector 112 to detect micro seismic events of interest according to equation (24), based on the calculated parameters and signal subspace bases. The moving window analysis therefore comprises automated statistical analysis with respect to multiple detection windows of the time series data.

The method 300 may yet further include calculating a confidence indicator for each event of interest that is detected, at operation 373. To this end, the event detector 112 may be configured to automatically calculate the confidence indicator based on the value of the sufficient detection statistic c(n). Such a P-value may be defined as, $$p(n) = 1 - F_{d,\hat{N}-d}\left(\frac{c(n)}{1-c(n)} \frac{\hat{N}-d}{d}\right), \quad (40)$$

An event detection flag and the calculated confidence indicator may be displayed on the display 121, at operation 377, for each detected event of interest.

The method 300 may comprise performing multiple iterations of at least some of the automatic parameter calculation and signal subspace construction operations in order to dynamically refine the event detector 112 (e.g., by iterative and automatic reconfiguration of the event detector 112), as indicated in part by dotted lines in FIG. 3. In this example, such dynamic reconfiguration may comprise automatically updating the event library 124 (operation 381), by use of the feedback module 127. As new events are detected, the newly detected events may be included in the event library 124.

Such updating of the event library 124 may automatically trigger recalculation of the signal subspace bases, for example through performance of operations 329-337, and 361, to dynamically update the design data matrix and signal subspace bases. The updated event library 124 may likewise serve as input for recalculation of the signal subspace dimension (at 343) upon which refined construction of the signal subspace bases (at 361) may be based. Waveform variations due to dynamic changes in the monitored reservoir, such as those caused by hydraulic fracture propagation, may be captured by dynamic reconfiguration of the event detector 112, in accordance with this example embodiment.

Dynamic updating or reconfiguration of the event detector 112 may also comprise adjusting the false alarm rate $P_F$ and its associated detection threshold γ, at operations 381 and 383, responsive to detection of new events, and may based on an assessment of the accuracy of such subsequent detections. If the detection of a greater number of events of interest is expected than those that are flagged by the event detector 112, an operator may manually increase the false alarm rate $P_F$ (operation 381), resulting in automatic reduction of the detection threshold γ (operation 383). On the other hand, if the event detector 112 returns an unexpectedly high number of false alarms in the form of detection of noise or spurious events, the allowed false alarm rate $P_F$ may be manually reduced (operation 381) in order to reject the false alarms, thereby resulting in an automatic increase in the detection threshold (operation 383). In such instances, the event detector 112 may, therefore, be calibrated by an operator by manual or selective alteration of a single statistical parameter (e.g., the false alarm rate).

One benefit of the system 100 in accordance with the example embodiment is that it provides effective management of the tradeoff between false alarms and missed events. Operator intervention is limited, while the knowledge and skill levels of such operators are reduced when compared to customary event detection. The system 100 offers flexibility to control the detection sensitivity tradeoff by adjusting $P_F$ value. Another benefit is that the system 100 also provides ability to characterize a specific source region by selecting a corresponding event library.

Modules, Components, and Logic

Certain embodiments are described herein as including logic or a number of components, modules, or mechanisms. Modules may constitute either software modules, with code embodied on a non-transitory machine-readable medium (i.e., such as any conventional storage device, such as volatile or non-volatile memory, disk drives or solid state storage devices (SSDs), etc.), or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry or in temporarily configured circuitry (e.g., configured by software), may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain, manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., Application Program Interfaces (APIs).)

Figure 8:
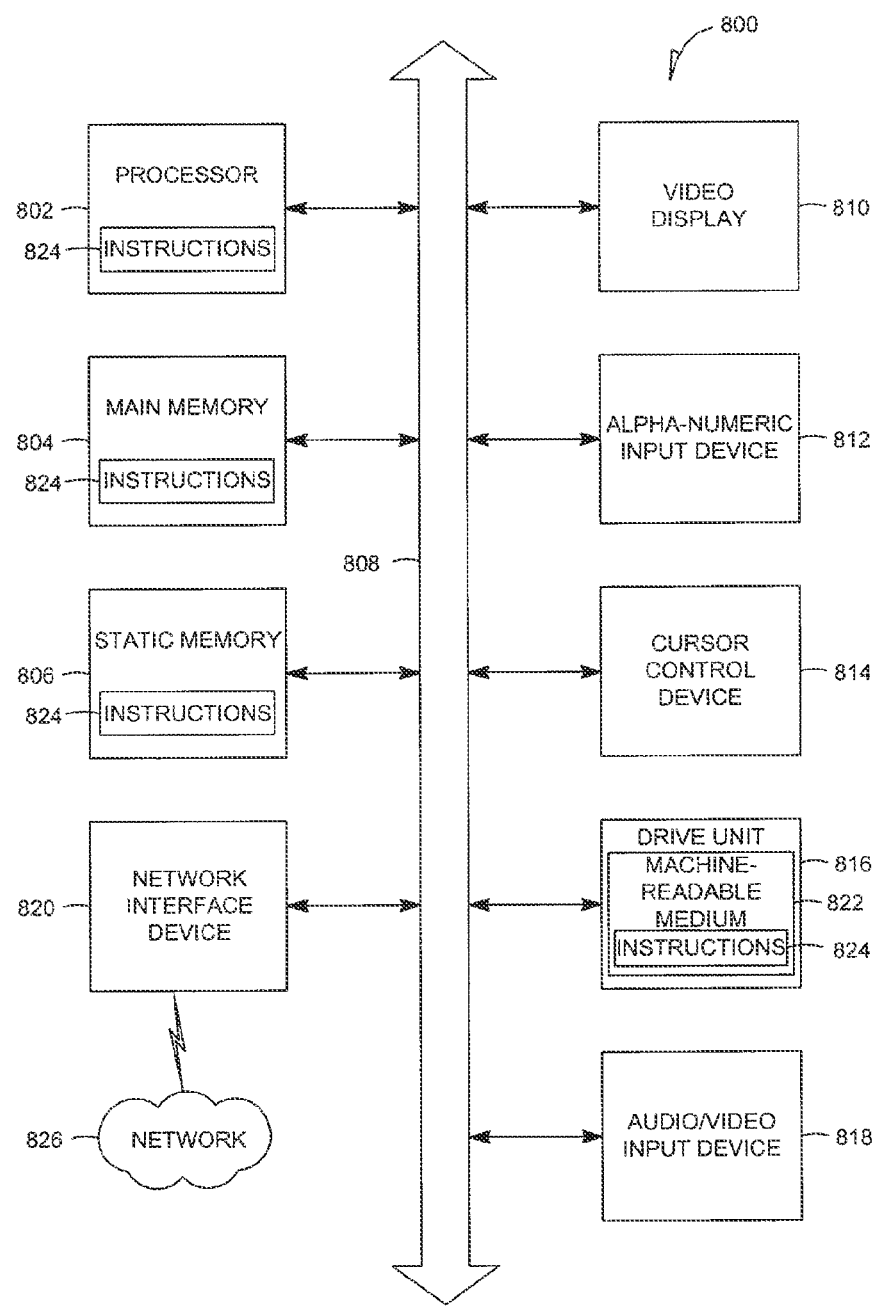
FIG. 8 is a diagrammatic representation of a machine in the example form of a computer system within which a set of instructions for causing the machine to perform any one or more of the automated methods/operations discussed herein may be executed.

FIG. 8 shows a diagrammatic representation of a machine in the example form of a computer system 800 within which a set of instructions, for causing the machine to perform any one or more of the methodologies discussed herein, may be executed. For example, the system 100 (FIG. 1) or any one or more of its components (FIGS. 1 and 2) may be provided by the system 800.

In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU) a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alpha-numeric input device 812 (e.g., a keyboard), a cursor control device 814 (e.g., a mouse), a disk drive unit 816, an audio/video input device 818 (e.g., a microphone/speaker) and a network interface device 820.

The disk drive unit 816 includes a machine-readable storage medium 822 on which is stored one or more sets of instructions (e.g., software 824) embodying any one or more of the methodologies or functions described herein. The software 824 may also reside, completely or at least partially, within the main memory 804 and/or within the processor 802 during execution thereof by the computer system 800, the main memory 804 and the processor 802 also constituting non-transitory machine-readable media.

The software 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database and/or associated caches and servers) that store the one or more sets of instructions. The term "machine-readable medium" shall also be taken to include any medium that is capable of storing a set of instructions for execution by the machine and that cause the machine to perform any one or more of the methodologies of this disclosure. The term "machine-readable medium" shall accordingly be taken to include, but not be limited to, solid-state memory devices of all types, as well as optical and magnetic media.

Therefore, as exemplified by the above-describe example systems and methods, various embodiments may be realized. These include a method that comprises receiving time series data representative of seismic activity sensed by a plurality of seismic sensors, the seismic activity including microseismic events in a subterranean formation; using one or more processors, automatically calculating one or more statistical parameters for performing automated analysis of the time series data to identify events of interest; and, using an event detector, performing automated analysis of the time series data, based at least in part on the one or more automatically calculated statistical parameters, to identify indication of microseismic events of interest in the time series data.

As mentioned previously, "a statistical parameter" means a parameter that is to be employed by the event detector in the event detection by the performance of statistical analysis on the time series data, the parameter not being a property of the events of interest, a source region where the events of interest are expected to originate, the subterranean formation that is being monitored, or the like. The statistical parameters may, for example, comprise a detection threshold, a false alarm rate, a signal subspace dimension, and/or a probability of detection.

The method may be performed by a system that comprises a receiver to receive the time series data, an event detector, and a configuration module to calculate the statistical parameters and configure the event detector accordingly.

The event detector may be a signal subspace detector that is configured to identify a microseismic event of interest if a particular value of the time series data for a respective detection window in a signal subspace exceeds a detection threshold. The automated statistical analysis may therefore comprise analyzing multiple detection windows of the time series data in a sliding window manner to identify indication of respective microseismic events of interest in one or more of the detection windows. For example, detection may be based on determining, for each detection window, whether a ratio of the measured energy in the signal subspace to total measured energy exceeds the detection threshold. The automated analysis of the data may comprise statistical analysis (for example, by applying a binary hypothesis test to each detection window).

The method may include, prior to performing event detection, multiplexing the multichannel data to a continuous stream of data and filtering the data to remove noise, thereby facilitating initial event detection for building an initial event library. An initial event detection operation may be run on the filtered data prior to the performance of automated analysis by the event detector. In some embodiments, the initial event detection is perforated manually by an operator. Instead, or in addition, initial event detection may be performed by a conservative STA/LTA detector.

Automatic calculation of an initial value for the detection threshold may comprise generating synthetic data indicative of the plurality of synthetic seismic events having distributed locations within a target range from a monitoring location. The target range may be selected such that the synthetic events are located approximately at a similar distance from the seismic sensors as the microseismic events that are to be detected. The synthetic events may be randomly distributed in the target range (e.g., being uniformly distributed in the target range). Automatic calculation of the initial value for the detection threshold may further comprise determining a sample correlation value of the synthetic events, and calculating the initial value for the detection threshold based on the sample correlation value.

The initial value for the detection threshold may be calculated based on the sample correlation value, for instance being automatically set at a value significantly greater than a maximum sample correlation value between the respective synthetic events (e.g., 3 to 5 times greater than the maximum sample correlation value).

Automatic calculation of the one or more statistical parameters may, instead, or in addition, comprise automatically calculating a signal subspace dimension, for example by automatically maximizing a sum of a detection probability over a signal to noise ratio (SNR) range.

The method may include automatically building an event library that comprises a plurality of identified events and automatically constructing a set of signal subspace bases based on the event library. The event library may include potential events detected by an operator or a first pass detector, as opposed to having been detected by the event detector. Initially, the event library may exclusively comprise such potential events. The set of signal subspace bases may serve to define the signal subspace associated with events of interest. Automatically constructing the set of signal subspace bases may comprise automatically clustering the identified events in the event library, forming a design set of events based on a cophenetic correlation criterion between the clustered events, and deriving the set of signal subspace bases from the design set.

The method may include, after clustering the events, aligning waveforms of the events in the design set by automatically performing preliminary alignment of the waveforms (for example, by using multi-channel cross-correlation) and thereafter performing finer scale alignment (for example, by direct minimization and/or adaptive stacking of the waveforms).

Configuration of the event detector may be dynamic, so that the system includes a feedback loop, to iteratively reconfigure the event detector responsive to identification of events of interest. Such reconfiguration of the event detector may comprise, automatically adding newly identified events to the event library on an ongoing basis to form an updated event library, constructing an updated set of signal subspace bases from the updated event library, and running the detector with the updated signal subspace bases. Dynamic reconfiguration of the event detector may instead, or in addition, include automatically recalculating the one or more statistical parameters based on the updated event library.

The method may thus comprise dynamically updating the event library and adjusting the detection threshold responsive to detection by the event detector of new events and/or responsive to false detections by the event detector. Note that automated analysis by the event detector may be performed repeatedly with respect to the same time series data, so that the statistical parameters and/or the signal subspace may iteratively be refined until the results of automated detection by the event detector are acceptable. Such refinement of the system settings/parameters may be performed by an operator who may manually change at least one statistical parameter based, for example, on an assessment of the accuracy of detection. The operator may, for example, change the value of a false alarm rate based on detection of too few or too many events of interest, resulting in automatic recalculation and the operation of the value of the detection threshold.

The method may include calculating a confidence level indicator, such as a P-value, for each detection.

Although this disclosure has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method comprising:
   receiving time series data representative of seismic activity sensed by a plurality of seismic sensors, the seismic activity including microseismic events in a subterranean formation;
   using one or more processors, automatically calculating one or more statistical parameters for performing automated analysis of the time series data to identify events of interest, the one or more automatically calculated statistical parameters including a signal subspace dimension; and
   using an event detector, performing automated analysis of the time series data, based at least in part on the one or more automatically calculated statistical parameters, to identify indication of micro seismic events of interest in the time series data.

2. The method of claim 1, wherein the event detector is a signal subspace detector that is configured to identify a micro seismic event of interest if a particular value of the time series data for a respective detection window in a signal subspace exceeds a detection threshold.

3. The method of claim 2, wherein the automatically calculating the one or more statistical parameters comprises automatically calculating an initial value for the detection threshold.

4. The method of claim 3, wherein the automatically calculating the initial value for the detection threshold comprises:
   determining a sample correlation value of synthetic data indicative of a plurality of synthetic seismic events; and
   calculating the initial value for the detection threshold based on the sample correlation value.

5. The method of claim 4, further comprising a prior operation of generating the synthetic data based on the plurality of synthetic seismic events, the plurality of synthetic seismic events having distributed locations within a target range from a monitoring location, typical SNR values corresponding to relevant field datasets, and randomly assigned moment tensors representative of possible source mechanisms.

6. The method of claim 4, wherein the calculating the initial value comprises setting the initial value of the detection threshold equal to a multiple of a maximum sample correlation value between the plurality of synthetic seismic events.

7. The method of claim 6, wherein the multiple of the maximum sample correlation value is between 3 and 5.

8. The method of claim 1, wherein the automatically calculating the signal subspace dimension comprises automatically maximizing a sum of a detection probability over a signal to noise ratio (SNR) range for a calculated detection threshold or false alarm rate.

9. The method of claim 2, further comprising:
   building an event library that comprises a plurality of identified events; and
   automatically constructing a set of signal subspace bases based on the event library.

10. The method of claim 9, wherein the automatically constructing the set of signal subspace bases comprises automatically:
    clustering the identified events in the event library;
    forming a design set of events based on a cophenetic correlation criterion between the clustered events; and
    deriving the set of signal subspace bases from the design set.

11. The method of claim 10, further comprising aligning waveforms of the events in the design set by automatically:
    performing preliminary alignment of the waveforms using multi-channel cross-correlation; and
    thereafter performing adaptive stacking of the waveforms.

12. The method of claim 2, further comprising dynamically reconfiguring the event detector responsive to identification of seismic events of interest in the time series data.

13. The method of claim 12, wherein dynamically reconfiguring the event detector comprises, on an ongoing basis:
    automatically adding a newly identified event to an event library comprising a plurality of identified events, to form an updated event library; and
    automatically constructing an updated set of signal subspace bases from the updated event library.

14. The method of claim 13, wherein dynamically reconfiguring the event detector includes automatically recalculating the one or more statistical parameters based on the updated set of signal subspace bases.

15. The method of claim 13, wherein the reconfiguring further comprises iteratively updating the one or more statistical parameters by assessing accuracy of resultant event detections.

16. The method of claim 1, wherein the performing of the automated statistical analysis comprises analyzing multiple detection windows of the time series data in a sliding window manner to identify indication of respective micro seismic events of interest in one or more of the detection windows.

17. The method of claim 16, wherein the performing of the automated statistical analysis further comprises calculating a confidence level indicator for each detected event.

18. A system comprising:

an input interface configured to receive time series data representative of seismic activity sensed by a plurality of seismic sensors, the seismic activity including microseismic events in a subterranean formation;

a configuration module comprising one or more computer processor devices configured to perform an automated calculation of one or more statistical parameters for performing automated analysis of the time series data to identify events of interest, the one or more automatically calculated statistical parameters including a signal subspace dimension; and an event detector comprising at least one computer processor device configured to perform automated analysis of the time series data, based at least in part on the one or more automatically calculated statistical parameters, to identify indication of micro seismic events of interest in the time series data.

19. A non-transitory computer readable storage medium having stored thereon instructions for causing a machine, when the instructions are executed by the machine, to perform operations comprising:

receiving time series data representative of seismic activity sensed by a plurality of seismic sensors, the seismic activity including microseismic events in a subterranean formation;

automatically calculating one or more statistical parameters for performing automated analysis of the time series data to identify events of interest, the one or more automatically calculated statistical parameters including a signal subspace dimension; and performing automated analysis of the time series data, based at least in part on the one or more automatically calculated statistical parameters, to identify indication of micro seismic events of interest in the time series data.

* * * * *